Oct. 27, 1931.  A. F. KEFFLO  1,829,659
TUBULAR SAW
Filed June 22, 1931
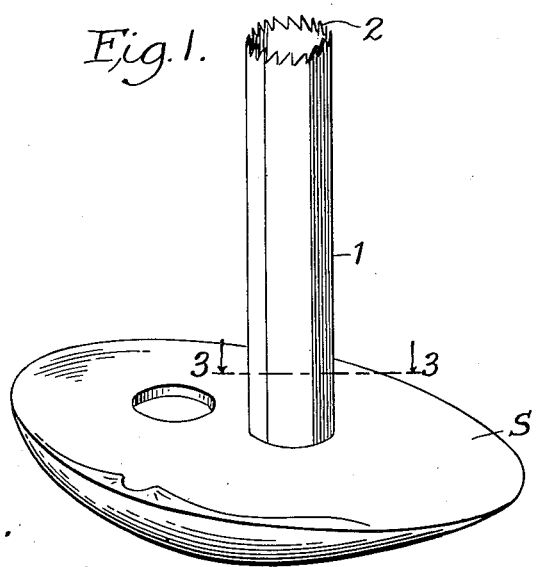
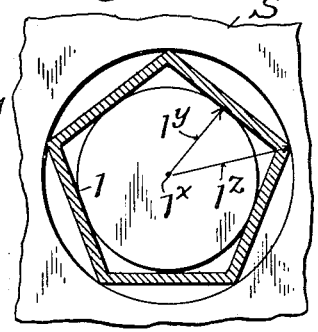
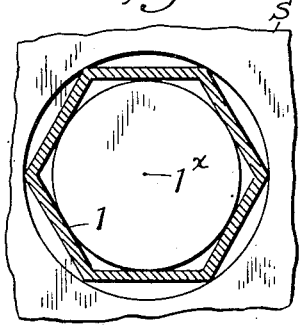
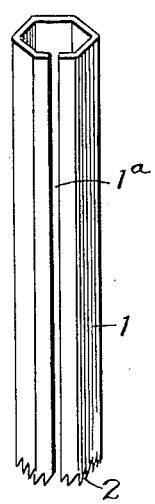
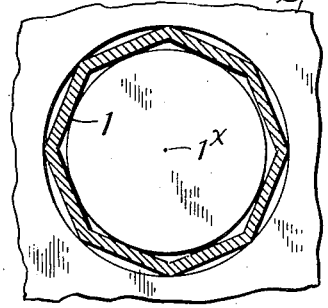
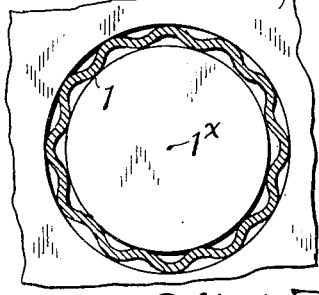
Inventor
Albert F. Kefflo
By
Alexander Dowell
Attorneys Patented Oct. 27, 1931

1,829,659

UNITED STATES PATENT OFFICE

ALBERT F. KEFFLO, OF MUSCATINE, IOWA

TUBULAR SAW

Application filed June 22, 1931. Serial No. 546,105.

This invention is a novel improvement in tubular crown saws particularly adapted for cutting button blanks from fresh water shells, salt water shells, mother of pearl shells, and for cutting disks from other materials such as ceramics, wood, fibre, composition, and the like.

The principal object of the invention is to provide a tubular saw or cutter having a constant polygonal profile with the teeth machine cut directly in the angularly disposed sides of the polygon which will obviate the necessity of hand filing and setting the teeth, i. e., bending the teeth alternately inwardly and outwardly in order to provide proper cutting clearance.

A further object of the invention is to provide a hollow polygonal shaped saw or cutter in which the teeth require no setting, the same being arranged in a regular or irregular polygonal profile and revolving around a fixed center of rotation, thereby providing proper clearance depending upon the length of each side of the polygon; whereby the saw may be made of air-hardening or self-hardening alloy high-speed steel. Hence I provide a saw or cutter which will permit continuous work and an increased saving of time and labor.

I will explain the invention with reference to the accompanying drawings which illustrates several practical embodiments thereof to enable others familiar with the art to adopt and use the same; and will summarize in the claims the novel features of construction for which protection is desired.

In said drawings:

Fig. 1 is a perspective view of my novel cutter in position for cutting a button blank from a shell.

Fig. 2 is a side elevation of one form of saw.

Fig. 3 is an enlarged section on the line 3—3 of Fig. 1.

Figs. 4, 5 and 6 are views similar to Fig. 3, but showing modified forms of the polygonal profiles for the saw or cutter.

Fig. 7 is a perspective view of a split tubular saw embodying my invention.

It has heretofore been customary in the button making industry to use tubular crown saws (solid or split) of circular profile constructed of relatively soft low-grade carbon steel in order that it might be possible to hand file the teeth and then set the teeth by bending the teeth alternately inwardly and outwardly to obtain the proper clearance. Obviously the life of such saws was short as the cutting edges of the teeth of such saws dull rapidly and limit the capacity of the tool, and the relatively soft teeth had to be maintained sharp by frequent hand filing and hand setting.

My novel improved crown saw of polygonal profile is designed to offset the difficulties arising when using such soft carbon steel saws of circular profile, and consists of a tubular or hollow body 1 of polygonal shape having three or more sides, and body being made of air-hardening or self-hardening alloy high speed steel, the teeth 2 being ground, without setting, in the ends of the body by means of an automatic grinding machine. The teeth of my high speed self-hardening steel saws cannot be filed by hand, but same can be readily ground by means of a carborundum abrasive wheel on an ordinary grinding machine.

The body 1 may be formed with a split $1a$ therein as in Fig. 7, or the split may be permanently closed by brazing or welding as in Figs. 2–6 inclusive, the body in either case being made of high-speed self-hardening sheet steel, and may contain an air-hardening alloy if desired, which sheet steel is readily purchasable in the open market.

As shown in Figs. 3–5 the unset teeth 2 are disposed on the angularly disposed sides of the polygonal body 1, which body rotates around a fixed center of rotation $1x$ and hence when operating in the shell or other material S the teeth of the polygonal rotating body will have a clearance equal to the difference in distances from the inside center of a side face to the outside end thereof, or, as shown in Fig. 3, the difference between the radii $1y$ and $1z$, the teeth on each side of the polygon progressively increasing in distance to the center of rotation, and hence the unset teeth will automatically provide ample clearance depending upon the width of the faces of the polygon.

In Fig. 3 the saw body has the contour of a five-sided polygon. In Fig. 4 the saw body has the contour of a hexagon. In Fig. 5 the saw body has the contour of an octagon. In Fig. 6 the saw body is shown as being corrugated longitudinally of the saw. In Figs. 3 to 6 inclusive the saw is shown as being solid and having no longitudinal split therein. Obviously the saw may be split as in Fig. 7.

As above stated the teeth require no setting and are cut in the ends of the saws by an automatic grinding machine and are hence disposed on a polygonal contour rotating about a fixed center of rotation; and due to the fact that self-hardening high-speed steel may be used for such saws the cutting edge of the teeth will remain sharp for a much longer period. In actual tests the saws have been found to produce three or four times more work than the soft carbon steel saws with set teeth heretofore used.

I do not limit my invention to the exact forms shown in the drawings, for obviously changes may be made therein within the scope of the claims; nor do I limit my saws for use in cutting button blanks from shells, for same may be used wherever tubular saws, either split or solid, are used.

I claim:

1. A saw comprising a tubular body adapted to rotate about a fixed center and having a polygonal contour with teeth formed in its ends, whereby setting of the teeth for clearance is obviated.

2. A tubular saw comprising a hollow body of sheet metal adapted to rotate about a fixed center and having a polygonal contour with teeth formed in its ends, whereby setting of the teeth for clearance is obviated.

3. A tubular saw comprising a hollow body of high-speed steel adapted to rotate about a fixed center and having a polygonal contour with teeth cut in its ends, whereby setting of the teeth for clearance is obviated.

4. A tubular saw comprising a hollow body of high-speed self-hardening steel adapted to rotate about a fixed center, said body having a polygonal contour with teeth formed in its ends, whereby setting of the teeth for clearance is obviated.

ALBERT F. KEFFLO.